UNITED STATES PATENT OFFICE.

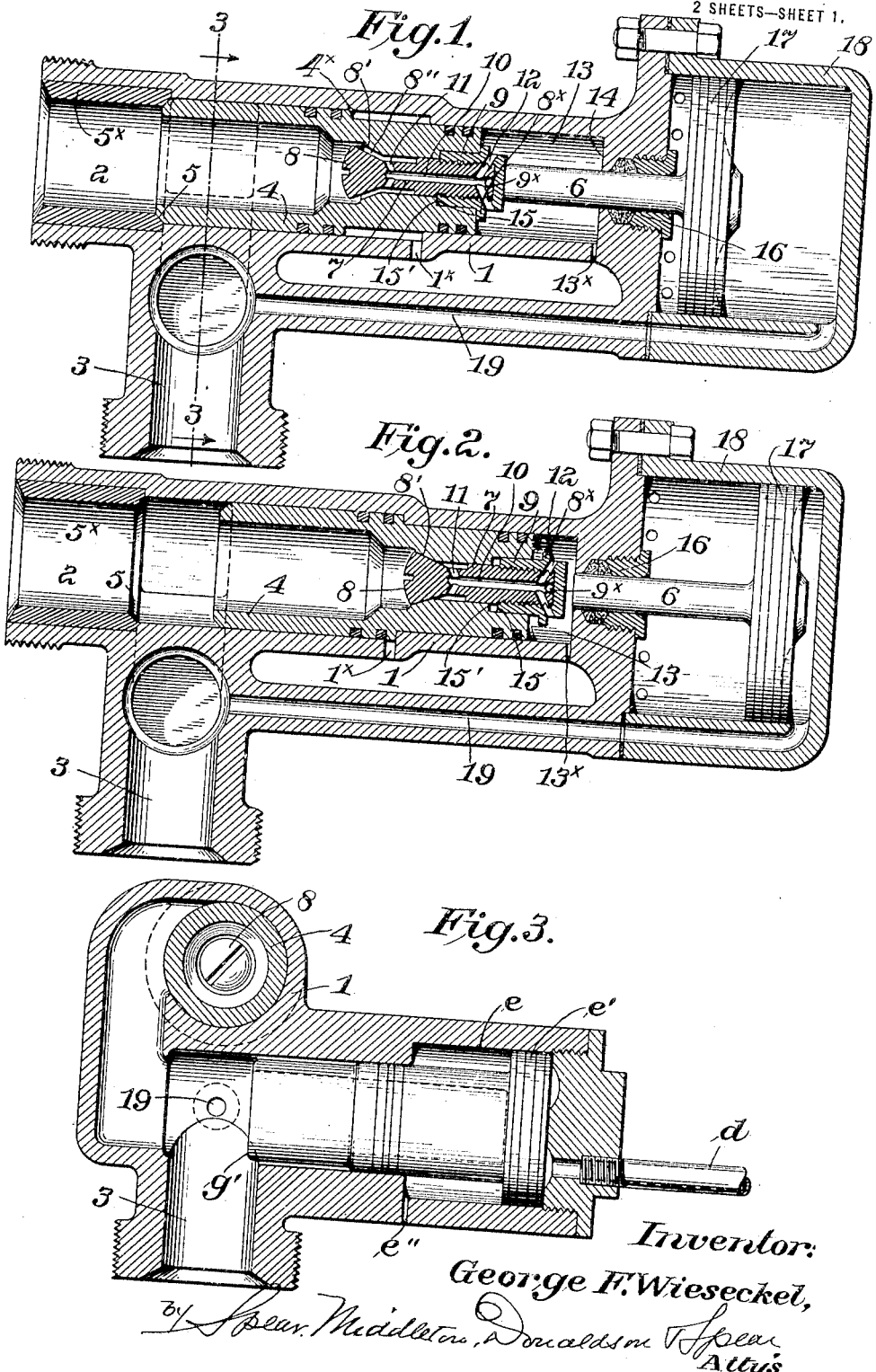

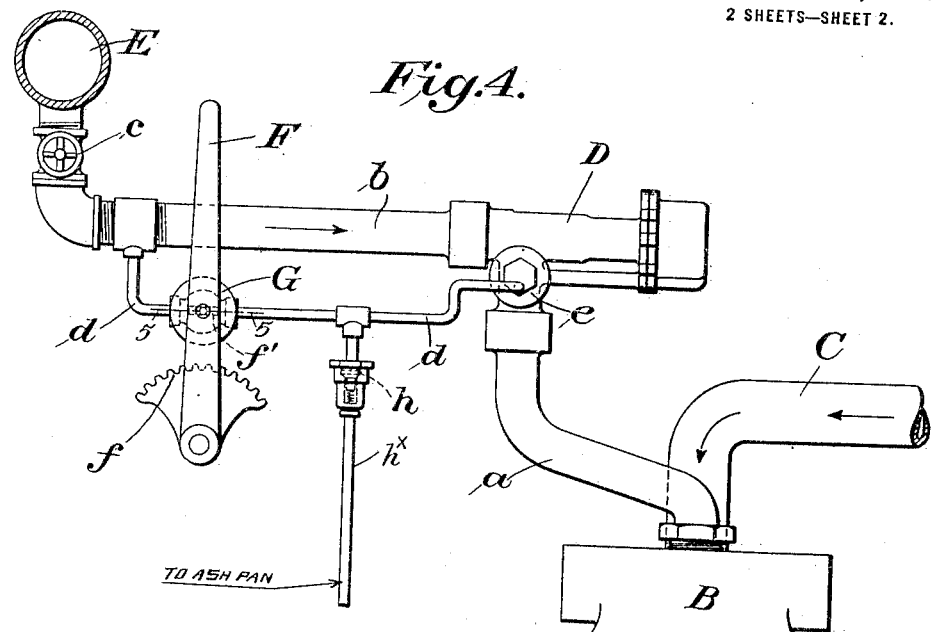
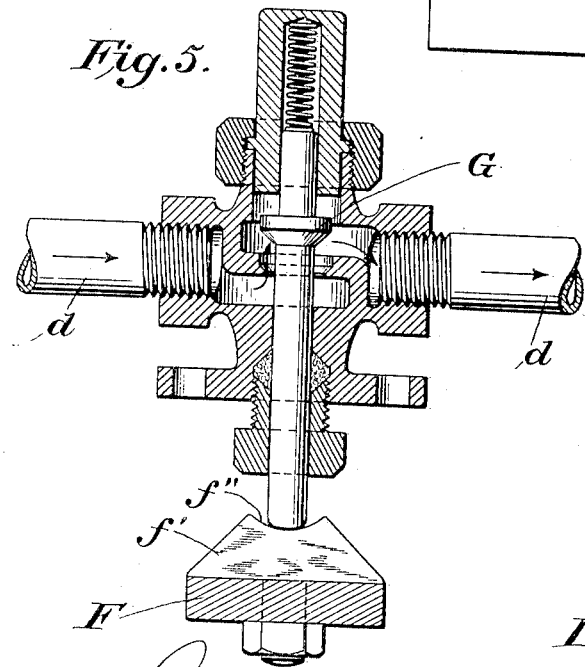

GEORGE F. WIESECKEL, OF HAGERSTOWN, MARYLAND.

DRIFTING-VALVE.

1,258,511.  Specification of Letters Patent.  Patented Mar. 5, 1918.

Application filed February 23, 1917. Serial No. 150,477.

*To all whom it may concern:*

Be it known that I, GEORGE F. WIESECKEL, a citizen of the United States, and resident of Hagerstown, Maryland, have invented certain new and useful Improvements in Drifting-Valves, of which the following is a specification.

The invention relates to drifting valves for locomotives to supply saturated steam to the valve chest of the cylinders to prevent the lubricating oil from burning, depositing carbon, and affecting the action of the valve, when the superheated steam is cut off, and it consists in the features and combination and arrangements of parts hereinafter described.

In the accompanying drawings;

Figure 1 is a sectional view of the drifting valve in closed position.

Fig. 2 is a similar view in open position.

Fig. 3 is a cross sectional view on the line 3—3 of Fig. 1.

Fig. 4 is a diagrammatic view of the system.

Fig. 5 is a detail view of a cut off valve in the engineer's cab, forming part of the system, with a cam on the reverse lever in operative position relative thereto, this view being a section substantially on the line 5—5 of Fig. 4.

Referring to Fig. 4 A is the engine cylinder, B the steam chest thereof. C the pipe for supplying superheated steam to the steam chest for driving the engine.

D represents the drifting valve, which, when the engine is drifting, is in communication with the steam chest by the pipe *a*. E is the saturated steam supply pipe, *b* a pipe leading therefrom to the drifting valve casing and *c* is a globe valve in said pipe which is opened when the engine leaves the round-house and is not shut off until the engine has been placed out of service, at its destination. F indicates the ordinary reversing lever, which, as in ordinary practice, is placed in neutral position when the engine is at rest. G represents generally a valve which is opened to supply steam through branch pipe *d* for setting a valve at *c* for cutting off the drift valve from the steam chest of the engine when the reverse valve is set in neutral position, and the engine is to remain at rest as will be more particularly described hereinafter.

Referring to Figs. 1, 2, and 3, 1 indicates the main casing of the drifting valve having a port 2 for the inlet of the saturated steam and a discharge port 3 leading through pipe *a* to the steam chest B of the engine cylinder.

In this casing a piston valve 4 is slidably mounted having a beveled end to fit a seat 5 on the removable ring $5^x$ at the inlet opening 2. This piston valve has within it an auxiliary valve member 7 having a head 8 of conical form to fit a conical seat $8'$ on the interior of the main valve 4. The stem of the auxiliary valve is screw-threaded into a socket piece 9 to bear on the end of the stem 6 of a piston 17 hereinafter referred to. The auxiliary valve has an axial passage 10 with ports 11 and 12 extending laterally at front and rear, the front ports opening through the neck of the valve in rear of the conical head and its seat and the rear ports opening out through the socket member into a chamber 13 formed between the rear face of the main valve and the head 14 of the valve casing. The auxiliary valve is movable in relation to the main valve. When in its rear position relative to the main valve as shown in Fig. 2 its head is on the conical seat in the main valve and no steam can then pass into chamber 13, but when the auxiliary valve is moved forward relative to the main valve then steam can pass through the space $8''$, Fig. 1, and the ports 11 and passage 10, and ports 12 into the chamber 13. The amount of movement of the auxiliary valve in relation to the main valve is determined in one direction by the shoulders 15 on the auxiliary valve coming against the shoulder 15 on the main valve and in the other direction by the auxiliary valve head 8 coming against its seat.

The movement of the main valve 4 to the right is limited by its exterior shoulder $4^x$ coming against a complementary shoulder on the interior of the valve casing. This shoulder aids in preventing leakage of steam to the chamber at the right of the main valve and limits the movement of the main valve and consequently of the auxiliary valve carried thereby so that the auxiliary valve will not be opened by coming against the wall of the casing.

As above stated the rear end of the auxiliary valve is borne upon by the end of the stem of the piston. This stem passes through a stuffing box 16 in the head of the main valve casing. The piston 17 is slidable in a cylinder 18 bolted to the head of the valve casing with suitable packing interposed. A passage 19 extends from the discharge port 3 to the cylinder 18 in rear of the piston 17.

While the engine is running the drifting valve is closed notwithstanding the fact that the valve c is open and saturated steam can reach the drifting valve, this closed position of the drifting valve being due to the fact that the pressure of the superheated steam in the steam chest is exerted through the pipe a, port 3, passage 19 and the cylinder 18 at the right of the relatively large diameter piston 17, which, having moved leftward, and having opened the auxiliary valve allows the pressure from the saturated steam pipe to pass into the chamber 13, and thus moves and holds the main valve 4 to its seat, the pressure of the saturated steam in chamber 13 acting on the main piston valve augmenting the effect of the pressure against the piston 17.

When the superheated steam is cut off from the engine cylinder, and the engine drifts pressure is immediately reduced in cylinder 18 back of piston 17, and the saturated steam at boiler pressure, supplied through valve c to the drifting valve 4 through the port 2, forces the valve to its open position shown in Fig. 2, allowing this saturated steam to pass to the steam chest of engine cylinder to act as a carrier for the lubricant and keep it from burning, it being understood that the pressure in the chamber 13 will not be trapped but will pass off through the auxiliary valve.

The opening of the drift valve by the saturated steam pressure is due to the cutting off of the superheated steam and the consequent reduction of pressure in the cylinder 18 back of piston 17.

The valve having opened to the position shown in Fig. 2 saturated steam will now be supplied to the steam chest as long as the engine drifts, the exhaust taking place through the usual exhaust ports of the cylinder.

When the engine stops the back pressure of the saturated steam will build up owing to there being no further exhaust from the cylinder and having built up to ten pounds in the rear of the piston 17 through the passage 19 and the area of this piston being greater than the area of the front end of the auxiliary valve the piston will move to the left and will open the auxiliary balance valve, allowing the pressure to get into chamber 13, which pressure added to that on the rear of piston 17 will force and keep the main valve to its seat, thus cutting off the supply of saturated steam to the steam chest of the cylinder.

During the above described action of forcing the main valve to its seat the auxiliary valve first will be moved from its seat, due to the lost motion between the shoulders 15 and 15', and thus a passage will be opened for the saturated steam pressure through the space 8" between the head of the auxiliary valve and its seat, thence through the ports 11, the axial passage 10, and the ports 12 into the chamber 13, where acting upon the rear face of the main valve the effect will be to hold this in closed position, in which position it remains while the engine is at rest. When starting up the engine from a temporary stop the saturated steam being constantly on and the drifting valve being open the superheated steam supplied for running the engine being under higher pressure than the saturated steam will pass back through the by-pass 19 into chamber 18 back of piston 17 and will operate the auxiliary valve to allow access of pressure into chamber 13 and the main valve will close.

A similar closing action takes place when after drifting for the desired length of time the engineer opens the throttle and supplies superheated steam for driving. The greater pressure will pass from the steam chest to the rear of piston 17 and will operate the same leftward to open the auxiliary valve, allowing pressure to get into chamber 13 and thus through the pressure in rear of piston 17 augmented by that in chamber 13 the main valve will be forced to its seat.

The auxiliary valve allowing, as it does, the boiler pressure to enter the chamber 13 insures that the main valve will remain closed until the pressure against piston 17 is sufficiently reduced.

The boiler pressure passing through the auxiliary valve to the chamber 13 will hold the main valve closed until the pressure against the piston 17 is reduced to say about five pounds before the main valve will open again.

By the use of the chamber 13 for receiving pressure back of the main valve I may employ a small diameter piston at 17 and only ten pounds pressure is needed here to effect the closing of the main valve.

When the engine is standing still with main valve closed, the auxiliary valve is open, allowing the full boiler pressure to get into chamber 13 and because of the area exposed on the auxiliary valve socket and its ring or flange $8^x$ the auxiliary valve will be held open (and main valve closed) until the pressure in chamber back of piston 17 has been entirely reduced, whereupon the auxiliary valve will close and cut off pressure from chamber 13 and main valve 4 will then open and saturated steam will pass to the engine and back pressure from this will move piston 17 open auxiliary valve again and allow pressure to enter chamber 13, whereupon main valve will close again and be held closed until pressure back of piston 17 is again entirely reduced and this action will be repeated at intervals as long as the engine stands still.

I also provide means whereby the drifting valve system may be cut off entirely from the engine cylinder steam chest, this action taking place as a result of the engineer placing the member F, known as the "reverse lever," in neutral position when the engine is to be left standing. This lever can be set in various positions by a usual detent, not shown, and a segment $f$.

When moved to neutral or middle position, as shown, it operates the valve G opening communication through the pipe $d$ for the passage of the saturated steam to the cylinder $e$, where acting on a piston $e'$ it drives the same inwardly and causes a valve member $g'$ carried by said piston to close the passage through the drifting valve casing leading to discharge port 3, so that there can be no further flow of saturated steam into the engine cylinder. This attachment is provided as a safe-guard against steam leakage or if for any reason the engineer wants to entirely cut off the drifting valve system from the engine cylinder. This cut off is in a sense automatic, in that its action takes place as a result of the engineer performing the usual act of setting the reverse lever F in neutral position.

In order to drain the pipe $d$ I provide a check valve at $h$ opening upwardly by spring pressure, but closing by the steam pressure above it, so that when steam is on in the pipe $d$ the valve $h$ will be closed, but when steam through said pipe is cut off the valve will open by the spring and will drain into the ash pan. A pipe $h^x$ extends from this valve.

In order to operate the valve G the lever F is provided with a cam member $f'$ which acts on the stem of the valve and opens it. This cam member has a notch $f''$ in which the end of the valve stem seats.

It will be noted that the main valve casing carries as one body the cylinder 18, the part having the passage 19, and the part through which the discharge port 3 is formed and the mounting for the shut-off valve $e$ including its piston and cylinder.

The passage between the inlet port 2 and the discharge port 3 is of special formation, as shown in Fig. 3, said passage extending part way around the valve casing through a part built up thereon.

I do not limit myself to the precise construction illustrated and described herein, this illustration being by way of an example of one physical embodiment of my invention.

The socket piece or nut 9 is held on the stem of the valve by a pin $9^x$.

I show at $13^x$ a drain opening for the chamber 13, at $1^x$ a drain from cylinder 1, and at $e''$ a drain opening for the chamber of the cut-off valve $g'$.

The shoulder in the main valve against which an opposing shoulder on the auxiliary valve seats serves to hold the pressure in chamber 13 from passing back along the outer side of the auxiliary valve.

Having thus fully described my invention what I claim as new is:

1. In combination in a drifting valve for locomotives, a casing, a main valve therein with a chamber in rear of said main valve to receive steam pressure, said main valve controlling the supply of saturated steam to the engine, an auxiliary valve to admit saturated steam supply to said chamber to assist in holding the valve to its seat, a piston, and cylinder for controlling the position of the auxiliary valve, and a connection between said cylinder and the steam chest to supply pressure to said cylinder to close the main valve against the saturated steam pressure and open the auxiliary valve, substantially as described.

2. In combination in a drifting valve for locomotives, a casing, a main valve therein controlling the supply of saturated steam to the steam chest of the locomotive, a chamber for saturated steam back of the main valve, an auxiliary valve admitting steam to said chamber for assisting in holding the main valve closed, a steam cylinder, and a piston therein for receiving saturated steam pressure or superheated steam pressure for controlling the said auxiliary valve, substantially as described.

3. In combination in a drifting valve for locomotives, a casing, a main valve with a chamber in rear thereof, said main valve controlling a port for supplying saturated steam to the engine, an auxiliary valve carried by and movable in relation to the main valve, and controlling communication between said chamber, and the saturated steam supply, whereby steam pressure may be supplied to said chamber for assisting in holding the main valve closed, and a piston and cylinder, the said piston acting upon the auxiliary valve to open it and said cylinder communicating with the steam chest of the engine, substantially as described.

4. In combination in a drifting valve for locomotives, a casing, a main valve with a chamber in rear thereof, said main valve controlling a port for supplying saturated steam to the engine, an auxiliary valve carried by and movable in relation to the main valve, and controlling communication between said chamber and the saturated steam supply, whereby steam pressure may be supplied to said chamber for assisting in holding the main valve closed, and a piston and cylinder, the said piston acting upon the auxiliary valve to open it and said cylinder communicating with the steam chest of the engine, through the port of said casing which communicates with the engine steam chest, substantially as described.

5. In combination in a drifting valve, a casing, a main valve slidably mounted therein, and controlling a port supplying saturated steam to the engine, said valve being exposed on its front face to the pressure of said steam, said casing having a chamber in rear of the main valve, an auxiliary valve slidable with and axially in relation to the main valve and controlling communication between the saturated steam supply on the front side of said valve, and the chamber in rear of said valve, a piston slidable coaxially in respect to the main and supplemental valves, a cylinder in which said piston is located, said cylinder communicating with the steam chest to receive pressure therefrom, said piston having a stem operating the auxiliary valve, substantially as described.

6. In combination in a drifting valve for locomotives, a casing, a connection for leading saturated steam thereto, a main valve therein, controlling a port leading to the cylinder steam chest, a chamber in rear of the main valve, an auxiliary valve admitting saturated steam to said chamber to assist in holding the main valve closed, a piston and a cylinder, said piston controlling the auxiliary valve, said casing having a passage communicating with the said port which leads to the cylinder steam chest to supply the said cylinder with superheated steam pressure to open said auxiliary valve, substantially as described.

7. A drifting valve for locomotives comprising a casing having an inlet port for saturated steam, a main valve having its end to be seated at said port, and movable in line with the axis of said port, said casing having a laterally extending port communicating with the steam chest of the engine and with the inlet port for saturated steam, said casing having a chamber in rear of said main valve, an auxiliary valve mounted in the main valve and controlling communication between the saturated steam supply on the front side of the main valve and said chamber and when open admitting steam to said chamber to assist in holding the main valve closed, a piston controlling the auxiliary valve, said piston moving coaxially with the main valve, the said piston cylinder being in communication with the discharge port to receive the pressure existing at the same, whether this be saturated steam received through the said inlet or superheated steam from the steam chest of the engine.

8. In combination in a drifting valve for locomotives, a casing, a main valve slidable therein, and controlling a port for the inlet of saturated steam to the steam chest of the engine, said casing having a chamber in rear of the said valve, an auxiliary valve slidably mounted in the main valve, and having a head to fit a seat on the main valve, said valve having a port extending lengthwise thereof to establish communication between the front side of said valve and the chamber at the rear of said valve to supply saturated steam to said chamber, a piston, and a cylinder, said piston having a rod extending through a head in the casing to the auxiliary valve to move the same from its seat, said cylinder being in communication with the steam chest, substantially as described.

9. In combination in a drifting valve, a casing, a valve controlling a saturated steam supply to the engine steam chest, a piston and cylinder, said cylinder being in communication with the steam chest and receiving superheated steam therefrom, and means operated by the piston for supplying saturated steam in rear of the valve to assist in holding the valve to its seat to cut off the saturated steam, when the engine is running, substantially as described.

10. In combination in a drifting valve, a casing, a valve controlling a saturated steam supply to the engine steam chest, a piston and cylinder, said cylinder being in communication with the steam chest and means operated by the piston for supplying saturated steam in rear of the valve to assist in holding the valve to its seat, when the engine is running, said saturated steam passing from front to rear of the said valve and through the same, substantially as described.

11. In a drifting valve system for locomotives, a connection for delivering saturated steam to the steam chest of the engine, a drifting valve automatically controlling the passage of steam through said connection, a cut off valve between the drifting valve and the steam chest for closing said connection and means for operating said cut off valve at the will of the engineer.

12. In a drifting valve system for locomotives, a connection for delivering saturated steam to the steam chest of the engine, a drifting valve automatically controlling the passage of steam through said connection, a cut off valve between the drifting valve and the steam chest for closing said connection and means for operating said cut off valve by steam pressure at the will of the engineer.

13. In a drifting valve system for locomotives, a connection for delivering saturated steam to the steam chest of the engine, a drifting valve automatically controlling the passage of steam through said connection, a cut off valve between the drifting valve and the steam chest for closing said connection and means for operating said cut off valve by steam pressure at the will of the engineer, said means consisting of a piston connected with the valve, a reverse lever, and a supply valve opened by the reverse lever when in neutral position to supply steam to the cut off valve operating piston, substantially as described.

14. In combination, a casing, a valve slidable longitudinally therein, said casing having a port at the front of said valve axially in line therewith, to be closed thereby, to control a saturated steam supply to the steam chest, a passage extending laterally from the interior of the casing adjacent said seat and partly around the casing, a discharge port extending at right angles to the said passage, and communicating therewith, a valve seat at the end of said passage, a valve adapted to said seat, a cylinder, a piston therein controlling the valve for shutting off communication between said passage and the discharge port, means for controlling the main valve, and a steam supply leading to the cylinder of the shut off valve, substantially as described.

In testimony whereof, I affix my signature.

GEORGE F. WIESECKEL.

Copies of this patent may be obtained for five cents each, by addressing the "Commissioner of Patents, Washington, D. C."